Sept. 13, 1966 N. L. MOULIN 3,273,109

ELECTRICAL CONNECTOR

Filed Jan. 20, 1964 2 Sheets-Sheet 1

INVENTOR.
NORBERT L. MOULIN,
BY
Walter R. Thiel
ATTORNEY.

INVENTOR.
NORBERT L. MOULIN,
BY
Walter R. Thiel
ATTORNEY.

3,273,109

ELECTRICAL CONNECTOR

Norbert L. Moulin, Placentia, Calif., assignor to Hughes Aircraft Company, Culver City, Calif., a corporation of Delaware Filed Jan. 20, 1964, Ser. No. 338,805
5 Claims. (Cl. 339—217)

The present invention relates to electrical connectors and particularly to an improved connector for flat conductors such as those used in printed circuit boards and flat multiconductor cables.

Modern aircraft, missiles, and computer circuitry require the utilization of numerous miniature and subminiature electrical components which are typically arranged in compact relationship and are electrically coupled by conductors such as the flat conductors of multiconductor cables or printed circuit boards. Because of the size of the components and the number of required electrical contacts that must be made to each circuit or module the electronics industry has striven continuously for a mechanically feasible and electrically acceptable connector.

Therefore, it is a primary object of the present invention to provide a novel and improved connector for coupling electrical conductors such as a conventional insulated circular wire conductor to the flat conductors of of a printed circuit board or a flat multiconductor cable in a manner capable of overcoming the mechanical and electrical difficulties heretofore encountered in such connectors.

A further object of the present invention is to provide an improved electrical connector for printed circuit boards or flat multiconductor cables which is mechanically feasible and electrically acceptable for even the most exacting requirements.

A still further object of the present invention is to provide an improved electrical connector for printed circuit boards or flat multiconductor cables having electrical contacts which may be removed easily from a connector block for repair or required circuit changes without damaging the block or disturbing other contacts.

A further object of the present invention is to provide an improved electrical connector for printed circuit boards or flat multiconductor cables having contacts shaped to engage the conductors of printed circuit board or flat multiconductor cables with a predetermined controllable contact force.

Briefly, the presently preferred embodiment of the electrical connector of the present invention comprises a connector block having a plurality of transverse chambers and a plurality of pairs of single piece contact members positioned in differing ones of said chambers. Each of the contact members includes a locking spring engaging a notch in the chamber to secure the contact in the connector block, a contact spring shaped to engage one of the conductors of a printed circuit board or a flat multiconductor cable under a predetermined contact force when a printed circuit board or multiconductor cable is inserted in the block and at least one pin receiving and securing spring arranged to receive and retain an electrical pin contact for connecting the contact to external circuitry.

Figure 1:
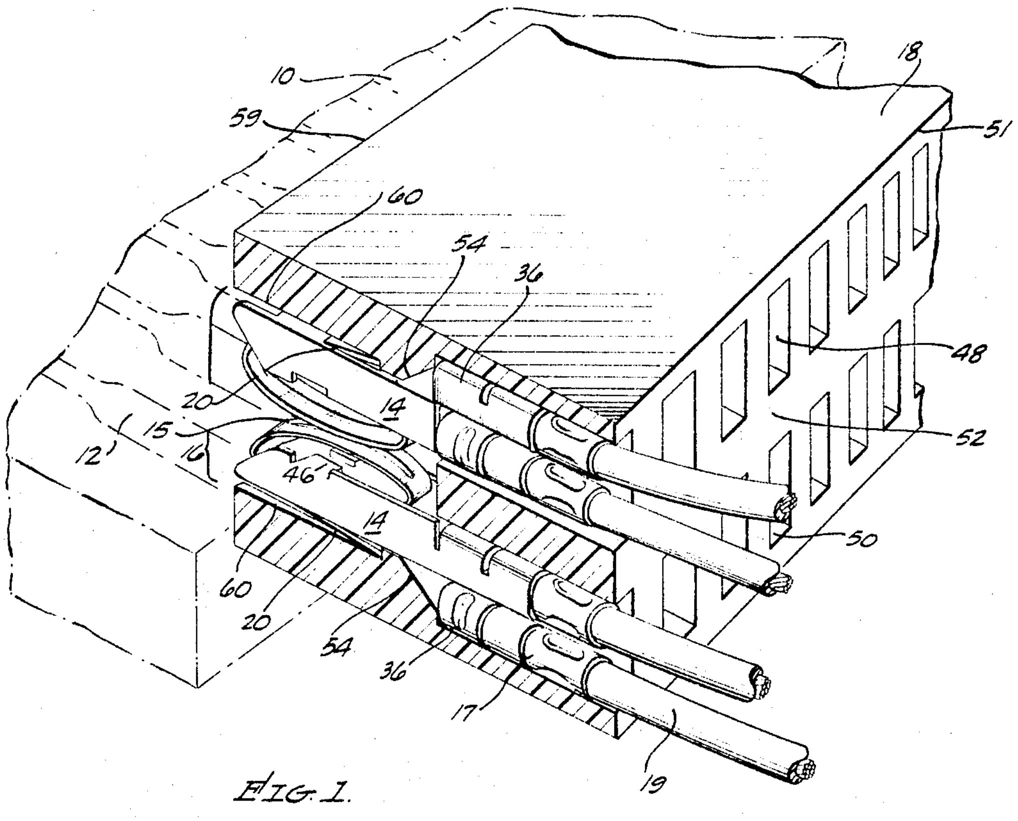

Other advantages of the invention will hereinafter become more fully apparent from the following description of the drawings which illustrate a preferred embodiment thereof, and in which:

FIGURE 1 is a perspective view partly in section of a presently preferred embodiment of the invention illustrating a typical application of the connector to a printed circuit board and showing for clarity a portion of the connector block and a portion of the printed circuit board shown in dotted lines and a section through one of the transverse chambers to illustrate the positioning of the contact members.

Figure 3:
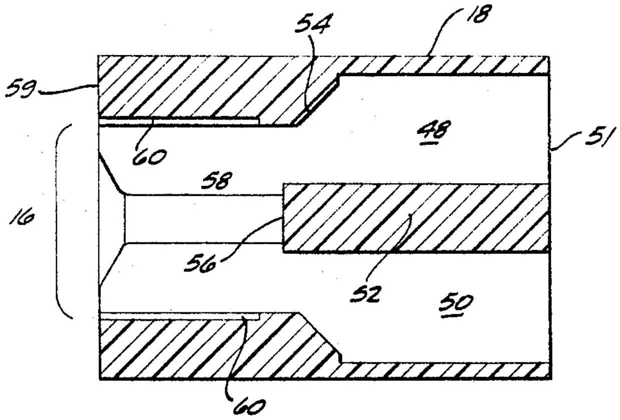
Figure 2:
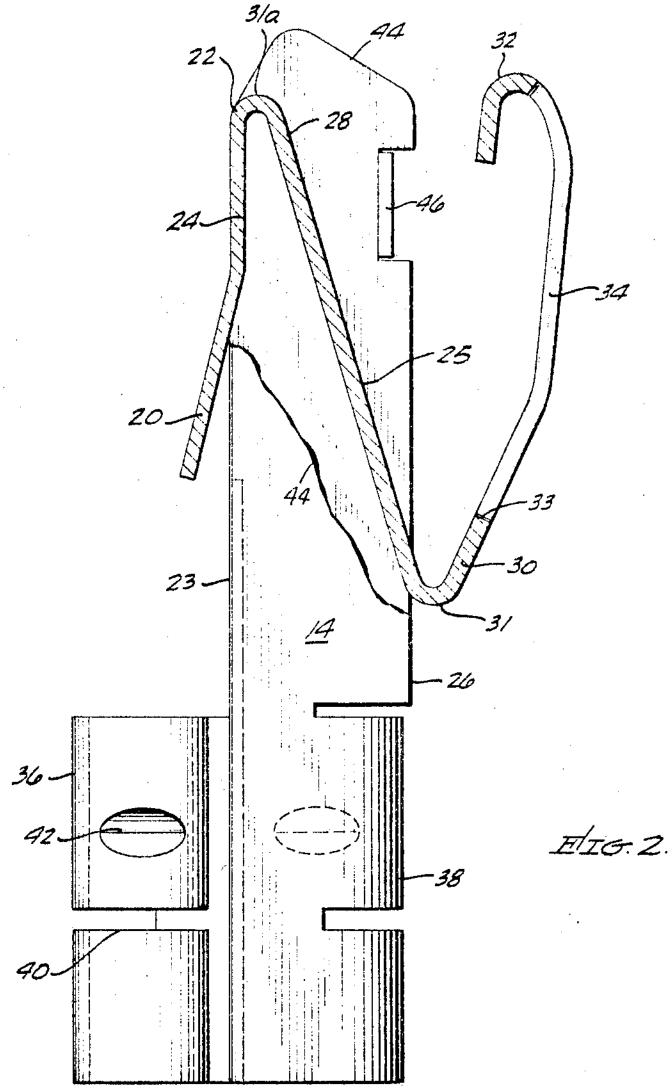

FIG. 2 is an enlarged side elevational view of the contact member of the presently preferred embodiment of the invention having a portion of the side wall of the contact member cut away to show the double cantilever sections of the contact spring and a portion of contact spring section and the locking spring shown in section; and FIG. 3 is an enlarged transverse sectional view of the connector block, taken at 3—3 in FIG. 1, showing the contact positioning chamber.

Referring first to FIG. 1, there is shown for illustration a conventional printed circuit board 10 which includes a plurality of flat conductors 12 terminating along one edge of the board. To make electrical contact to each of the conductors 12, the board 10 is typically inserted into a passage 15 formed by a pair of contact members 14 each of which has connected to it, by a suitable electrical connector 17 such as an electrical pin connector one end of an electrical conductor 19 the other end of which, not shown, is connected to a remote electrical component. To position the contact member for engagement with a flat conductor it is inserted into a transverse chamber 16 in a rigid connector block 18 of a hard nonconductive material such as glass filled diallyl phthalate. For illustration, the contact block 18 has been shown to include a specific number of chambers each of identical dimension; however, it is to be understood that within the scope of this invention and depending upon the desired use of the connector, the number of chambers may be varied.

Referring now to FIG. 2, one embodiment of the contact member 14 of the present invention has an elongated shape and is typically formed from a continuous single piece of a material such as beryllium-copper alloy which may have a $50 \times 10^{-6}$ inch gold over silver coating. The contact member 14 includes an elongated portion 22 which is formed into a locking spring 20 extending away from a first surface 23 and a contact spring 25 extending away from a second longitudinal surface 24 opposite from the locking spring. The contact spring 25 includes a double cantilever spring having first and second springs 28, 30 separated by curved portions 31, 31*a* and a curved or hooked portion 32 at the exposed end thereof. Intermediate the hooked portion 32 and the curved portion 31 is a flat contact surface 34, and if desired for improved contact properties, a slit or bifurcation 33.

On the other end of the contact member 14 from that containing the locking and contact springs 20, 25 are first and second electrical pin receiving and retaining springs 36, 38. Each of the these springs includes a split cylinder having a notch 40 and a detent 42 so that when an electrical pin contact is inserted into the split cylinder, FIG. 1, the pin securely contacts the spring and is retained therein against undesired separation by the spring and detent. It should be understood that while two split cylindrical electrical pin receiving and retaining springs has been shown and described as a connector means for electrically connecting the contact member to remote electrical components, the nature, shape, and number of connector means may be changed without varying from the scope of the present invention.

Extending generally longitudinally of the contact member 14 are a pair of side walls 44 having a lanced or crimped portion 46 near the end thereof which provides a retaining means for the curved portion 32 so that it can be inserted beneath the crimped portion for retention thereby. Thus a specific predetermined contact force can be provided in the contact spring 24 by selecting a predetermined radius for the curved portions 31, 31*a*.

Referring now to FIG. 3 in addition to FIG. 1, the chamber 16 includes first and second portions 48, 50 extending from a first side of the block 51 and separated by a divider 52. Each of said portions terminates in a retaining or contact shoulder 54 which is substantially adjacent an inner end 56 of the divider 52. The chamber 16 also includes a third portion 58 which extends from substantially the inner end 56 to a second side 59 of the connector block 18 and includes a pair of locking spring retaining grooves or notches 60. The insertion of a contact member into each of the first and second portions 48, 50 brings the first pin receiving and retaining spring 36 into contact with the contact shoulder 54 and the locking spring 20 in engagement with the notch 60. In this manner, when two contact members are secured in the chamber, a passage 15 is provided between each of the contact springs of sufficient width for the insertion of a printed circuit board or flat multiconductor cable.

While one embodiment of this invention has been herein illustrated it should be appreciated by those skilled in the art that variations of the disclosed arrangement both as to its details and to the organization of such details may be made without departing from the spirit and scope thereof. Accordingly, it is intended that the foregoing disclosure and showings made in the drawings may be considered as illustrative of the principles of this invention and not construed in a limiting sense.

What is claimed is:

1. An electrical connector comprising:

a connector block including at least one transverse chamber having first, second and third portions and a divider separating said first and second portions, said first and second portions each having a retaining shoulder and said third portion having a pair of spring locking grooves; and a pair of juxtaposed single piece contact members each positioned in a differing one of said first and second portions each of said members including a pair of elongated side walls each having a lanced section, a pair of electrical conductor pin receiving and locking springs, one of which engages said shoulder, a locking spring engaging one of said grooves and a double leaf contact spring extending into said third portion and having a curved extremity engaging said lanced sections whereby said pair of contact members defines a passage adapted to receive a flat conductor and to contact opposite surfaces thereof.

2. An electrical connector comprising:

a connector block having at least one transverse chamber having first, second and third portions, said first and second portions being separated by a divider and include a retaining shoulder, said third portion being of a width greater than the width of said first and second portions and including a pair of spring locking grooves; and a pair of juxtaposed single piece contact members each positioned in a differing one of said first and second portions, each of said members including a pair of elongated side walls each having a lanced section, a pair of electrical conductor pin receiving and locking springs, one of which engages said shoulder, a locking spring engaging one of said grooves and a double leaf contact spring extending into said third portion and having a curved extremity engaging said lanced sections whereby said pair of contact members defines a passage adapted to receive a flat conductor and to contact opposite surfaces thereof.

3. An electrical connector comprising:

a connector block including at least one transverse chamber, said chamber having a first and second portion separated by a divider extending from a first side of said block to a point slightly more than one half the width thereof, and including a retaining shoulder, said chamber also having a third portion extending from a second side of said block to said divider and of a width greater than that of said first and second portions and including a pair of spring locking grooves; and a pair of juxtaposed single piece contact members each positioned in a differing one of said first and second portions, each of said members including a pair of elongated side walls each having a lanced section, a pair of electrical conductor pin receiving and locking springs, one of which engages said shoulder, a locking spring engaging one of said grooves and a double leaf contact spring extending into said third portion and having a curved extremity engaging said lanced sections whereby said pair of contact members defines a passage adapted to receive a flat conductor and to contact opposite surfaces thereof.

4. A connector comprising:

a connector block of an electrically nonconductive material including at least one transverse chamber having first, second and third portions and a divider separating said first and second portions, said first and second portions each having a retaining shoulder and said third portion having a pair of spring locking grooves; and a pair of juxtaposed single piece contact members of an electrically conductive material positioned in said chamber, each of said members including a pair of elongated side walls, each having a lanced section, a pair of electrical conductor pin pressure and locking springs, one of which engages said shoulder, a locking spring engaging said groove and a double cantilever contact spring extending into the third portion of said chamber and having a curved extremity engaging each of said lanced section and a contact surface generally parallel with the contact surface of the other contact member but separated therefrom by a passage whereby a flat member inserted into said third portion will be contacted on opposite sides by a different one of the contact surfaces of said contact members.

5. A connector comprising:

a connector block of an electrically nonconductivity material having at least one transversely directed chamber, said chamber having a first portion and second portion separated by a divider extending from a first side of said block to a point slightly more than one half the width thereof, and including a retaining shoulder, said chamber also having a third portion extending from a second side of said block to said divider and of a width greater than that of said first and second portions and including a plurality of spring locking grooves; and a pair of juxtaposed single piece contact members of an electrically conductive material each positioned in a differing one of said first and second portions, each of said members including a pair of elongated side walls each having a lanced section, a pair of electrical conductor pin receiving and locking springs, one of which engages said shoulder, a locking spring engaging one of said grooves and a double leaf contact spring extending into said third portion and having a curved extermity engaging said lanced sections and a contact surface generally parallel with the contact surface of the other contact member but separated therefrom by a passage whereby a flat member inserted into said third portion will be contacted on opposite sides by a different one of the contact surfaces of said contact members.

References Cited by the Examiner

UNITED STATES PATENTS

| | | | |
|---|---|---|---|
| 1,531,816 | 3/1925 | Russell | 339—262 |
| 2,911,612 | 11/1959 | Jackson et al. | 339—217 X |
| 3,001,171 | 9/1961 | Schultz | 339—217 X |
| 3,209,310 | 9/1965 | Schwartz et al. | 339—217 X |

EDWARD C. ALLEN, *Primary Examiner.*

PATRICK A. CLIFFORD, *Examiner.*